(12) United States Patent
Kaku et al.

(10) Patent No.: US 11,290,308 B2
(45) Date of Patent: Mar. 29, 2022

(54) RELAY DEVICE

(71) Applicant: DENSO CORPORATION, Kariya (JP)

(72) Inventors: Yoshifumi Kaku, Kariya (JP); Taichi Itagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/809,647

(22) Filed: Mar. 5, 2020

(65) Prior Publication Data

US 2020/0313935 A1 Oct. 1, 2020

(30) Foreign Application Priority Data

Mar. 29, 2019 (JP) .............................. JP2019-068007

(51) Int. Cl.
| | |
|---|---|
| *H04L 25/20* | (2006.01) |
| *H04L 29/06* | (2006.01) |
| *H04L 12/741* | (2013.01) |
| *H04L 69/22* | (2022.01) |
| *H04L 45/74* | (2022.01) |
| *H04L 45/00* | (2022.01) |

(52) U.S. Cl.
CPC .............. *H04L 25/20* (2013.01); *H04L 69/22* (2013.01); *H04L 45/66* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 8,848,608 B1* | 9/2014 | Addepalli | H04Q 9/00 370/328 |
| 2006/0274674 A1 | 12/2006 | Okita et al. | |
| 2009/0067440 A1* | 3/2009 | Chadda | H04L 45/74 370/401 |
| 2009/0304008 A1 | 12/2009 | Kono et al. | |
| 2016/0059853 A1* | 3/2016 | Yamakoshi | B60W 10/18 701/36 |
| 2016/0065536 A1* | 3/2016 | Aoshima | H04L 61/2015 370/392 |
| 2018/0063000 A1* | 3/2018 | Wu | H04L 61/6022 |
| 2020/0021557 A1* | 1/2020 | Shikata | H04L 49/30 |
| 2020/0053003 A1* | 2/2020 | Shikata | H04L 45/66 |
| 2020/0136861 A1* | 4/2020 | Ogawa | H04L 12/40006 |
| 2020/0153655 A1* | 5/2020 | Ogawa | H04L 69/324 |
| 2020/0220838 A1* | 7/2020 | Ogawa | H04L 61/6022 |
| 2021/0006435 A1* | 1/2021 | Iwata | H04L 7/00 |

* cited by examiner

*Primary Examiner* — Duc T Duong
(74) *Attorney, Agent, or Firm* — Posz Law Group, PLC

(57) ABSTRACT

A relay device for relaying a frame between a plurality of communication lines includes: a rewriting unit configured to rewrite at least one predetermined target field among a plurality of fields included in a received frame; and an execution unit configured to execute a process on the received frame according to a predetermined filtering rule. The execution unit executes the process based on a description of an applied frame which is prepared by applying a description after rewriting the target field in the received frame by the rewriting unit.

9 Claims, 7 Drawing Sheets

FIG. 4

| | D-MAC | S-MAC | VID | D-IP | S-IP |
|---|---|---|---|---|---|
| PRE-RELAY FRAME | MAC-L | MAC-A | VL_A | IP-B | IP-A |
| POST-RELAY FRAME | MAC-B | MAC-L | VL_B | IP-B | IP-A |

HEADER PORTION

| # | PORT NUMBER | MAC ADDRESS |
|---|---|---|
| 0 | P1 | MAC-A |
| 1 | P2 | MAC-B |
| 2 | P3 | MAC-C |

| # | IP ADDRESS | MAC ADDRESS |
|---|---|---|
| 0 | IP-A | MAC-A |
| 1 | IP-B | MAC-B |
| 2 | IP-C | MAC-C |

FIG. 7

| # | SUBNET ADDRESS | NETMASK | VLAN | NEXT HOP |
|---|---|---|---|---|
| 0 | xxx.xxx.aa.0 | /24 | VL_A | DIRECT ROUTE |
| 1 | xxx.xxx.bb.0 | /24 | VL_B | DIRECT ROUTE |
| 2 | xxx.xxx.cc.0 | /24 | VL_B | ..... |

| RULE NUMBER | APPLIED PORT | D-MAC | S-MAC | TYPE | ... | ... |
|---|---|---|---|---|---|---|
| 1 | P1 | MAC-B | MAC-A | IPv4 | xxx | xxx |
| 2 | xxx | xxx | xxx | xxx | xxx | xxx |

25A

RELAY DEVICE

CROSS REFERENCE TO RELATED APPLICATION

The present application claims the benefit of priority from Japanese Patent Application No. 2019-68007 filed on Mar. 29, 2019. The entire disclosure of the above application is incorporated herein by reference.

TECHNICAL FIELD

The present disclosure to a relay device configured to relay a frame between multiple communication lines.

BACKGROUND

A conceivable technique provides to relay a frame between multiple communication lines in a network.

As a network switch configured to relay frames between multiple communication devices, an Ethernet switch has been known. Ethernet is a registered trademark. Some network switches such as the Ethernet switches implement security functions, such as performing filtering on the frames to be relayed. Filtering is a function of performing various processes, such as frame transfer and frame discard, in accordance with predetermined conditions for the frame.

SUMMARY

According to an example embodiment, a relay device for relaying a frame between a plurality of communication lines includes: a rewriting unit configured to rewrite at least one predetermined target field among a plurality of fields included in a received frame; and an execution unit configured to execute a process on the received frame according to a predetermined filtering rule. The execution unit executes the process based on a description of an applied frame which is prepared by applying a description after rewriting the target field in the received frame by the rewriting unit.

BRIEF DESCRIPTION OF THE DRAWINGS

The above and other objects, features and advantages of the present disclosure will become more apparent from the following detailed description made with reference to the accompanying drawings. In the drawings:

FIG. 4 is an illustrative diagram showing an example of a header portion in a pre-relay frame and a post-relay frame;

FIG. 5 is an illustrative diagram illustrating an example of a port table;

FIG. 6 is an illustrative diagram illustrating an example of an ARP table;

FIG. 7 is an illustrative diagram illustrating an example of a routing table;

FIG. 8 is an illustrative diagram illustrating an example of a first rule table;

DETAILED DESCRIPTION

In a conceivable relay device, at least one field may be rewritten with respect to the received frame. In order to realize various filtering, it may be desirable to perform filtering on a frame in which the field has been rewritten.

However, as a result of a detailed examination by the present inventors, it has been found that there is no relay device capable of appropriately performing filtering on the frame in which the field has been rewritten.

A technique is provided to be capable of appropriately performing various filtering on a frame.

According to an example embodiment relay device configured to relay a frame between a plurality of communication lines, includes: a rewriting unit configured to rewrite at least one predetermined target field among a plurality of fields included in a received frame; and an execution unit configured to execute a process on the received frame according to a predetermined filtering rule. The execution unit executes the process based on a description of an applied frame which is prepared by applying a description after rewriting the target field in the received frame by the rewriting unit.

In the relay device according to the present disclosure, when it is desired to perform filtering on the frame in which the target field has been rewritten, the filtering can be appropriately performed on the frame. As a result, in the relay device according to the present disclosure, various filtering can be appropriately performed on the frame.

Embodiments of the present disclosure will be described below with reference to the drawings.

1. First Embodiment

[1-1. Configuration]

Figure 1:
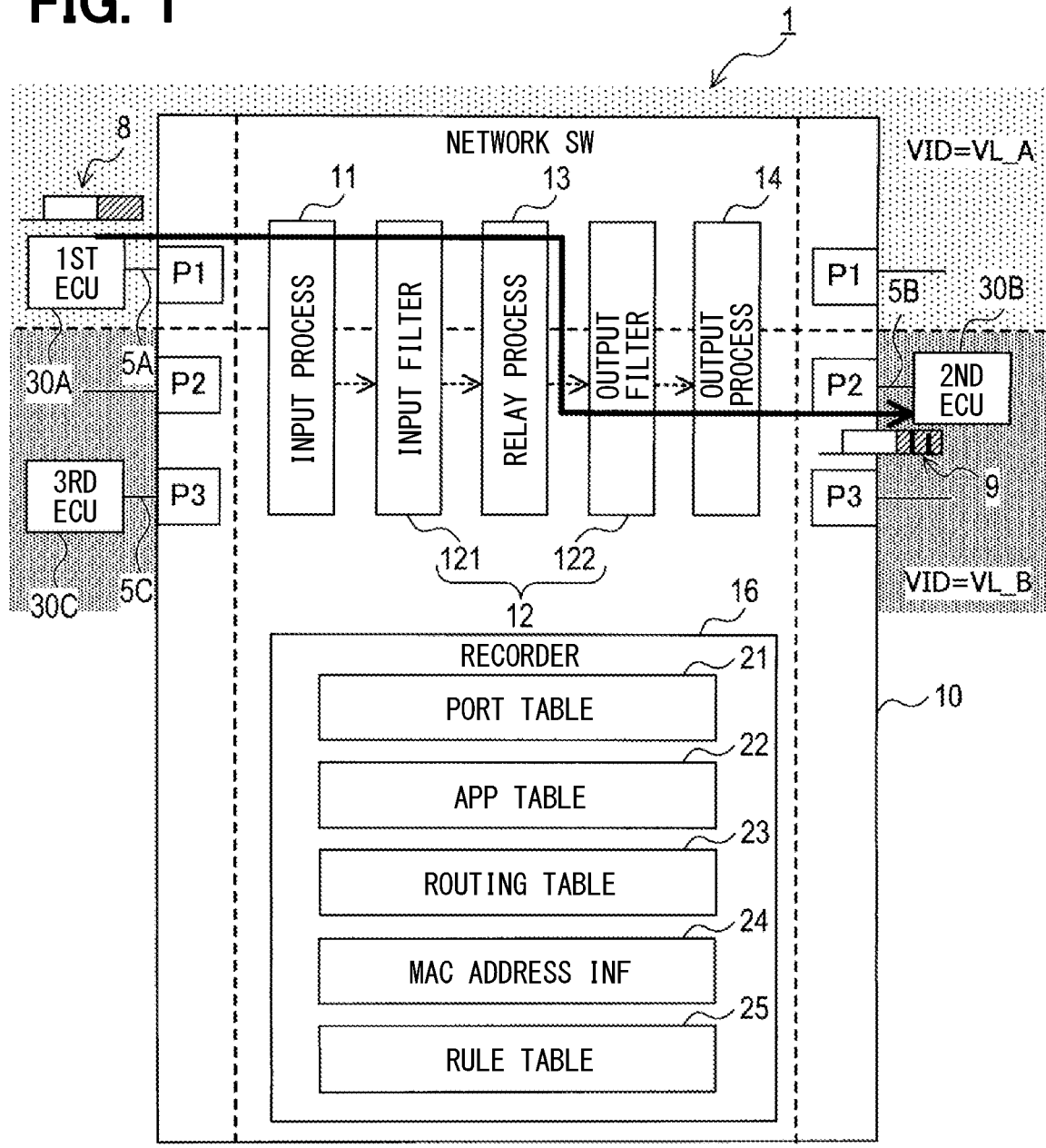
FIG. 1 is a block diagram showing a configuration of a communication system and a network switch.

A communication system 1 shown in FIG. 1 is a system that is mounted on a vehicle such as a passenger car, for example, for relaying a frame between communication devices in the vehicle. The frame is communication data to be relayed. The communication system 1 includes a network switch 10 which is a relay device. The communication system 1 may include multiple electronic control units (hereinafter referred to as ECUs) 30, which are communication devices.

In the present embodiment, the communication system 1 includes a first ECU 30A, a second ECU 30B, and a third ECU 30C. The ECU is an abbreviation for Electronic Control Unit.

The network switch 10 relays a communication between the ECUs 30 installed in the vehicle. The network switch 10 relays a communication data based on protocols such as Ethernet and IP (that is, Internet Protocol). In the present embodiment, the network switch 10 is configured as a layer 2/layer 3 (L2/L3) switch. However, as will be described later, the configuration of the network switch 10 is not limited to the L2/L3 network switch.

The network switch 10 includes multiple ports P1 to P3 for transmitting and receiving the frames. In other words, the ports P1, P2, and P3 are physical ports and function as transceivers for transmitting and receiving the frames. The number of ports may be any number of two or more, for example, 2 or 4.

FIG. 1 shows a view in which the network switch 10 is cut open in order to make the order of processing easier to understand. In other words, in FIG. 1, the network switch 10 is described as if the network switch 10 includes a set of P1 to P3 as reception ports and another set of P1 to P3 as transmission ports. In fact, however, the network switch 10 includes only the ports P1 to P3. Each of the ports P1 to P3 functions as a reception port and a transmission port.

The reception port is a port having a function of receiving the frame from outside the network switch 10. The transmission port is a port having a function of transmitting the frame to the outside of the network switch 10. The port P1 belongs to a VLAN "VL_A", and the ports P2 and P3 belong to a VLAN "VL_B".

Three communication lines 5A, 5B, and 5C are connected to the ports P1, P2, and P3, respectively. The first ECU 30A is connected to the port P1 through the communication line 5A, and the second ECU 30B is connected to the port P2 through the communication line 5B. The third ECU 30C is connected to the port P3 through the communication line 5C. The first ECU 30A, the second ECU 30B, and the third ECU 30C communicate with each other through the communication line 5A, 5B, and 5C and the network switch 10.

The network switch 10 is configured to filter and relay the frames between the multiple communication lines 5A, 5B, and 5C. The network switch 10 is configured as hardware including a circuit such as a semiconductor device, for example. Filtering refers to processing a frame according to a filtering rule to be described later.

Figure 2:
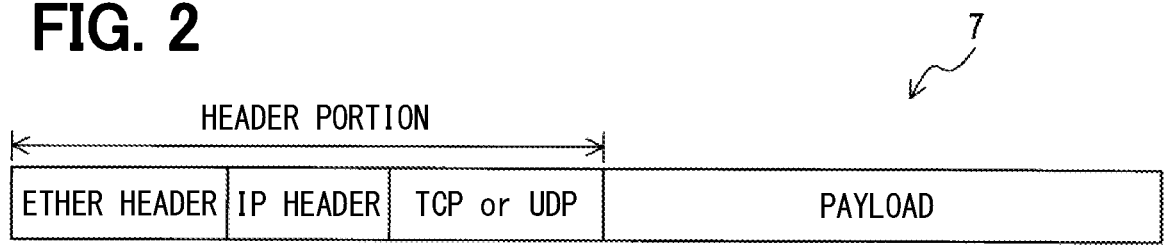
FIG. 2 is an illustrative diagram showing an example of a frame.

The frame transmitted and received by the multiple communication lines 5A, 5B, and 5C has, for example, a configuration as shown in FIG. 2. In other words, the frame 7 includes a header portion and a payload which is actual data, and is transmitted and received in the order of the header portion and the payload. The header portion includes an Ether header, an IP header, and an UDP header. Instead of the UDP header, a TCP header may be provided.

The header information to be described below indicates data of the header portion of the frame 7 shown in FIG. 2. A field is a group in which individual piece of information are stored in the frame.

For example, the Ether header includes a field for storing a destination MAC address (hereinafter referred to as D-MAC), a source MAC address (hereinafter referred to as S-MAC), an Ether Type, VIDs, and the like. The Ether Type indicates what the layer 3 protocols such as IPv4 and IPv6, are.

The VID indicates, for example, the ID number of the VLAN used in a tag VLAN (Tag VLAN) defined by the IEEE802.1q. The VID indicates to which VLAN the Ethernet frame to be transferred belongs. In other words, the VLAN can be identified by the VID and the Ethernet frame can be transferred between the ports of the same VLAN.

The IP header includes fields describing a destination IP address (hereinafter referred to as D-IP), a source IP address (hereinafter referred to as S-IP), a TP protocol, and the like. The TP protocol indicates whether the type of the protocol is UDP or TCP, for example. The UDP header includes a field for storing a UDP destination port number (hereinafter referred to as D-UDP port), a UDP source port number (hereinafter referred to as S-UDP port), and the like. In the same manner, the TCP header includes a field for storing a TCP destination port number (hereinafter referred to as D-TCP port), a TCP source port number (hereinafter referred to as S-TCP port), and the like.

As shown in FIG. 1, the network switch 10 further includes an input processing unit 11, filter units 12, a relay processing unit 13, and an output processing unit 14.

The input processing unit 11 receives a frame from any one of the ports P1, P2, and P3.

The relay processing unit 13 performs routing on the received frame. The received frame is a frame received by the network switch 10 at the reception port. In addition, in the present specification, the routing refers to processing for relaying the received frame to an appropriate port based on the description of the frame.

At the time of routing, the relay processing unit 13 may rewrite at least one predetermined target field among multiple fields included in the received frame. For example, a network (that is, the VLAN) to which a source described in the received frame belongs differs from a network (that is, the VLAN) to which a destination described in the received frame belongs. The multiple fields are multiple fields included in the header portion of the frame.

The target field may be a source field and a destination field by the relay processing unit 13. The source field is a field in which the source address of the frame is described, and the destination field is a field in which the destination address of the frame is described. The address referred to in the present specification is a MAC address or an IP address.

Hereinafter, an example in which the source field and the destination field are rewritten by the relay processing unit 13 will be described. In the present embodiment, a frame received from the reception port and transferred through the input filter unit 121 to be described later is input to the relay processing unit 13, but the input filter unit 121 will be omitted for simplification of description below.

Figure 3:
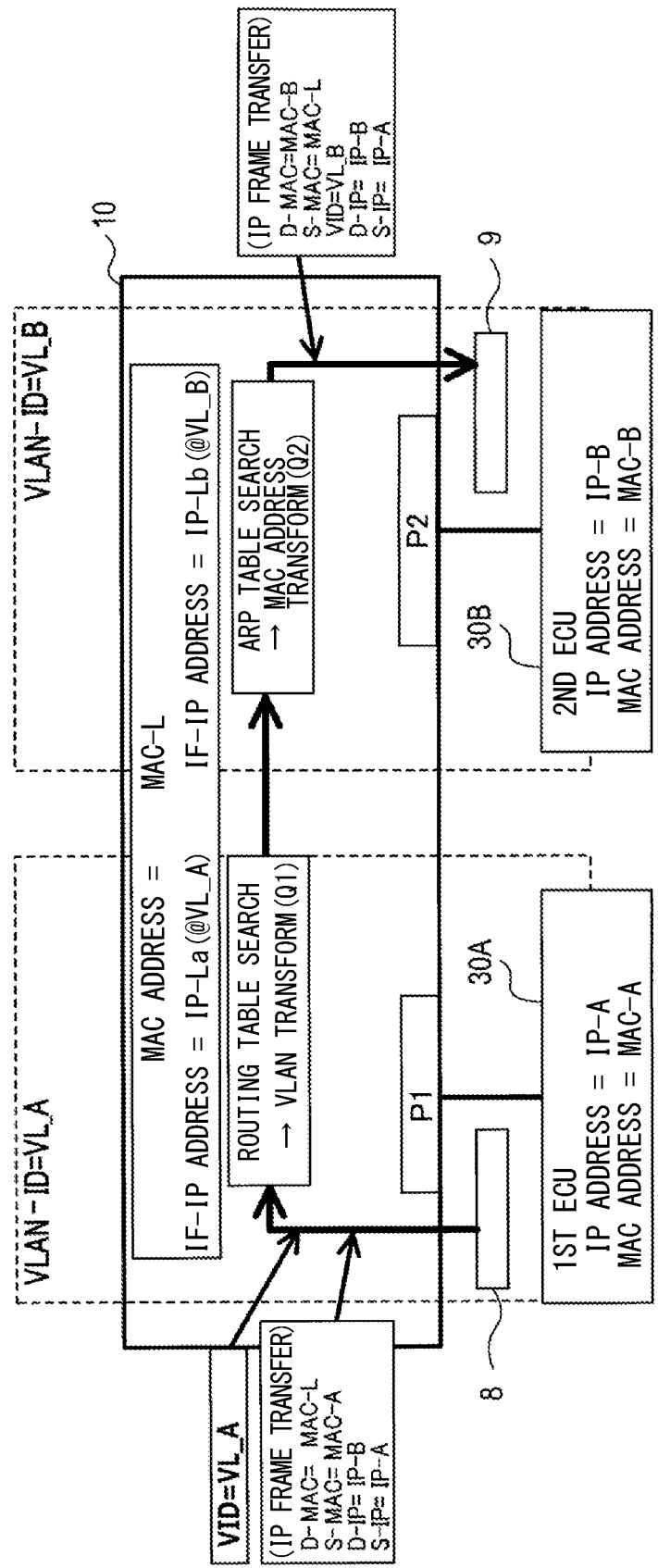
FIG. 3 is an illustrative diagram showing an example of L3 routing.

As shown in FIG. 3, the relay processing unit 13 executes L3 routing, which is a process of an upper layer of the Ethernet, based on a port table 21, an ARP table 22, a routing table 23, and the like, which will be described later.

In the present specification, it is assumed that a pre-relay frame 8 to be transmitted from the first ECU 30A to the second ECU 30B is input to the relay processing unit 13, for example, as shown in FIG. 4. The pre-relay frame 8 is a frame received by the network switch 10, which is a frame before the L3 routing by the relay processing unit 13 is executed. In FIG. 4, a part of the field of the header portion in the frame is shown.

In the pre-relay frame 8, the MAC address (that is, the MAC address (MAC-A)) of the first ECU 30A, which is a source device of the pre-relay frame 8, is stored in the S-MAC. The D-MAC stores a MAC address (that is, MAC-L) of the network switch 10, which is a device belonging to the same network as the source device shown in the S-MAC. "VL_A" which is an ID of the VLAN to which the first ECU 30A, which is the source device of the pre-relay frame 8, belongs, is stored in the VID.

An IP address (that is, IP-A) of the first ECU 30A, which is the source device of the pre-relay frame 8 is stored in the S-IP. An IP address (that is, IP-B) of the second ECU 30B, which is the destination device of the pre-relay frame 8 is stored in the D-IP.

Upon receiving the pre-relay frame 8 from the port A, the relay processing unit 13 detects whether or not the port receiving the pre-relay frame 8 and the destination device of the pre-relay frame 8 belong to the same network. For example, the relay processing unit 13 acquires the D-IP of the pre-relay frame 8. Then, as shown in (Q1) of FIG. 3, the relay processing unit 13 determines whether or not to match the network address of the received port based on the routing table 23, and if the addresses matches each other, the relay processing unit 13 determines that the port and the destination device belong to the same network. In an example of FIG. 4, the relay processing unit 13 detects that the first ECU 30A, which is the source device of the pre-relay frame 8, and the second ECU 30B, which is the destination device of the pre-relay frame 8, belong to different networks. When it is detected that the first ECU 30A and the second ECU 30B belong to different networks, the relay processing unit 13 rewrites the VID from "VL_A" to "VL_B" based on the routing table 23. The "VL_B" indicates the VID to which the second ECU 30B, which is the destination device indicated by the D-IP in the pre-relay frame 8, belongs.

When the relay processing unit 13 detects that the received port and the destination device belong to the different networks based on the IP addresses as described above, the relay processing unit 13 rewrites the S-MAC and the D-MAC based on the ARP table 22 as shown in (Q2) of FIG. 3.

As a result, a post-relay frame 9 that has been received by the network switch 10 and subjected to the routing by the relay processing unit 13 is rewritten as shown in FIG. 4. In other words, the D-MAC in the post-relay frame 9 is rewritten to the MAC address (that is, MAC-B) of the second ECU 30B which is the destination device indicated by the D-IP (that is, IP-B) in the pre-relay frame 8.

The S-MAC in the post-relay frame 9 is rewritten to the MAC address (that is, MAC-L) of the network switch 10 which is the destination device indicated by the D-MAC in the pre-relay frame 8.

In this manner, the relay processing unit 13 rewrites at least the S-MAC and the D-MAC in the pre-relay frame 8 at the time of L3 routing. In the present embodiment, the S-MAC corresponds to a source field, and the D-MAC corresponds to a destination field.

The output processing unit 14 outputs the frame to be relayed input to the output processing unit 14 to any one of the ports P1 to P3 and transmits the frame. In the present embodiment, the frame transferred through the output filter unit 122, which is the post-relay frame 9 described above, corresponds to a frame to be relayed.

The filter units 12 each implement various processes such as transfer, discard, and the like on the received frame in accordance with a predetermined filtering rule. The filtering rule is a rule for determining processing for a frame according to characteristics of the frame such as an address included in the received frame, a frame format, a data length of the frame, a type of the frame, and the like. The filtering rule is described by a rule table 25 to be described later.

The processing referred to in the present specification is not limited to transfer and discarding, and may be various processing other than transfer and discarding. The transfer may be the transfer of the frame to the same destination as the destination described in the header or the like of the received frame, or may be the transfer of the frame to a destination different from the destination described in the header or the like of the received frame. The destination may be described by any one of the ports P1 to P3, a MAC address, an IP address, a port number, or the like. Discarding is the deletion of a frame without transmission of the frame from any of the ports P1 to P3.

The filter unit 12 may be provided before the relay processing unit 13, that is, between the input processing unit 11 and the relay processing unit 13, or may be provided after the relay processing unit 13, that is, between the relay processing unit 13 and the output processing unit 14. The former is referred to as an input filter unit 121, and the latter is referred to as an output filter unit 122. In the present embodiment, an example will be described in which the filter units 12 include both the input filter unit 121 and the output filter unit 122.

In the present embodiment, the filter units 12 are configured to execute processing according to the filtering rule based on the description of the applied frame by executing filter processing described later. The applied frame is a frame in which the description after rewriting by the relay processing unit 13 is applied to at least one target field in the frame received by the network switch 10.

In the case of the input filter unit 121, the pre-relay frame 8 corresponds to a frame received by the input filter unit 121. In the case of the output filter unit 122, the post-relay frame 9 corresponds to a frame received by the output filter unit 122.

The storage unit 16 may be, for example, a standby RAM to which a data retention power is constantly supplied, or may be a rewritable non-volatile memory such as an EEPROM or a flash memory.

The storage unit 16 is configured to store the port table 21, the ARP table 22, the routing table 23, MAC address information 24, and the rule table 25.

The port table 21 is, for example, as shown in FIG. 5, a table representing combinations of the ports P1, P2, and P3 and MAC addresses of the ECUs 30, which are communication devices connected to the respective ports. The MAC address of the first ECU 30A is MAC-A, the MAC address of the second ECU 30B is MAC-B, and the MAC address of the third ECU 30C is MAC-C.

The ARP table 22 is, for example, as shown in FIG. 6, a table representing a combination of the MAC address and the IP address. The IP address of the first ECU 30A is IP-A, the IP address of the second ECU 30B is IP-B, and the IP address of the third ECU 30C is IP-C.

The routing table 23 is a table for holding a list of paths to destinations of individual networks as shown in FIG. 7, for example. FIG. 7 shows that devices in the network can communicate directly in VL_A and VL_B.

The MAC address information 24 is a MAC address (that is, MAC-L) of the network switch 10, and is stored in advance in the storage unit 16.

The port table 21, the ARP table 22, the routing table 23, and the MAC address information 24 can be used as management information in the filter processing by the filter unit 12. The management information refers to at least one piece of information for associating a description before rewriting by the relay processing unit 13 in a target field with a description after rewriting by the relay processing unit 13 in the target field. In other words, the management information is information for associating the pre-relay frame 8 with the post-relay frame 9.

For example, the input processing unit 11 may be configured to acquire or generate each piece of management information and store each piece of management information in the storage unit 16.

The rule table 25 is a table that describes at least one condition item group having multiple condition items for representing a filter processing content for the frame received by the filter units 12. For example, the input processing unit 11 may be configured to acquire or generate the rule table 25 and store the rule table 25 in the storage unit 16. Alternatively, the rule table 25 may be stored in the storage unit 16 in advance.

In the present embodiment, an example in which the first rule table 25A shown in FIG. 8 is used as the rule table 25 will be described.

The condition item group for one row in the rule table 25 describes one filtering rule. In the rule table 25, multiple filtering rules can be described.

As shown in FIG. 8, the filtering rule in the first rule table 25A includes condition items such as a rule number, an application port, a D-MAC, an S-MAC, and an EtherType.

However, the condition items included in the filtering rule are not limited to the above examples. The filtering rules may include, for example, condition items such as a VID, a D-IP, an S-IP, a TP protocol, an S port, and a D port in addition to the above examples. The S port is a source port number of a frame to which the filtering rule is applied, and indicates an S-UDP or an S-TCP. The D port is a destination port number of a frame to which the filtering rule is applied, and indicates a D-UDP or a D-TCP.

In this example, in the first rule table 25A shown in FIG. 8, the condition item group having the rule number of 1 indicates a filter for a frame in which the D-MAC represents the second ECU 30B and the S-MAC represents the first ECU 30A among the IPv4 frames received at the port P1. The indicated frame can be subjected to processing such as transfer and discard.

In addition, a large number of filtering rules can be set in the rule table 25, but a description of those filtering rules is omitted in the present specification.

[1-2. Processing]

Next, the filter processing to be executed by the filter unit 12 will be described with reference to a flowchart of FIG. 9. The filter units 12 referred to in the present specification may be either the input filter unit 121 or the output filter unit 122.

The filter processing is started when a frame is input to the filter unit 12. In the following description of the filter processing, the received frame refers to a frame input to the filter unit 12.

In S110, the filter unit 12 determines whether or not the received frame is to be rewritten by the relay processing unit 13. In this example, when the received frame is to be rewritten by the relay processing unit 13, the filter unit 12 shifts the process to S120. On the other hand, when the received frame is not to be rewritten by the relay processing unit 13, the filter units 12 perform the filter processing without rewriting the received frame. The case where the received frame is to be rewritten by the relay processing unit 13 includes, for example, a case where the received frame is to be rewritten by an upper layer.

In the present embodiment in which the L2/L3 switch is the network switch 10, the filter unit 12 determines that the received frame is to be rewritten by the upper layer when the received frame is subjected to the L3 routing. Specifically, when the filter unit 12 detects that the network to which the received port belongs and the communication device represented by the D-IP belong to different networks in the received frame, the filter unit 12 determines that the received frame is subjected to the L3 routing.

For example, in the example of the pre-relay frame 8 in FIG. 4, the MAC address (that is, MAC-L) of the network switch 10 is described in the D-MAC, and the IP address (that is, IP-B) of the second ECU 30B is described in the D-IP. The filter unit 12 detects that the port receiving the frame belongs to a network different from the network of the second ECU 30B based on the ARP table 22 and the routing table 23, and determines that the received frame is subjected to the L3 routing.

However, the method of determining whether or not the received frame is subjected to the L3 routing is not limited to the above method, and various other determination methods are applicable.

In S120, the filter unit 12 identifies the description after rewriting by the relay processing unit 13 with respect to the destination field in the received frame based on the control information. Thereafter, the filter unit 12 shifts the process to S130.

In the present embodiment, the D-MAC corresponds to the destination field. Specifically, in order to identify the description after rewriting in the D-MAC, the filter unit 12 first acquires the IP address described in the D-IP of the received frame. Next, the filter unit 12 identifies the MAC address corresponding to the IP address described in the D-IP based on the ARP table 22.

Then, the filter unit 12 identifies the identified MAC address as a description in the D-MAC of the received frame after rewriting by the relay processing unit 13, and stores the identified MAC address in the storage unit 16 as rewritten information. In other words, the rewritten information described above is the description after rewriting by the relay processing unit 13, which is identified for the destination field in the received frame.

Through the processing of this step, even when the filter unit 12 is installed as the input filter unit 121 at the preceding stage of the relay processing unit 13, the filter unit 12 can identify the description after rewriting in the destination field.

In S130, the filter unit 12 identifies a description in the source field of the received frame before rewriting by the relay processing unit 13 based on the management information. Then, the filter unit 12 shifts the process to S140.

In the present embodiment, the S-MAC corresponds to a source field. Specifically, the filter unit 12 first acquires the IP address described in the S-IP of the received frame. Next, the filter unit 12 identifies the MAC address corresponding to the IP address described in the S-IP based on the ARP table 22. Then, the filter unit 12 identifies the identified MAC address as a description in the S-MAC of the received frame before rewriting by the relay processing unit 13, and stores the identified MAC address in the storage unit 16 as pre-rewriting information.

With the processing of the above step, the filter unit 12 can identify the description before rewriting in the source field even when the filter unit 12 is installed at the succeeding stage of the relay processing unit 13 as the output filter unit 122.

In the following S140, the filter unit 12 executes processing according to the filtering rule based on the description of the applied frame. In the present specification, the applied frame means a frame to which the description before rewriting in the D-MAC, which is identified in S120, and the description after rewriting in the S-MAC, which is identified in S130, are applied in the received frame.

In the present embodiment, the filter unit 12 overwrites the description of the D-MAC with the rewritten information described above for the received frame, overwrites the description of the S-MAC with the above-mentioned pre-rewriting information, and performs filtering based on the overwritten description of the applied frame. For example, in the example of FIG. 4, a description 50 of a portion surrounded by a thick frame in FIG. 4 corresponds to the description of the applied frame described above. Then, the filter unit 12 completes the filter processing.

The filter unit 12 may be configured to generate the applied frame based on the received frame, and execute processing according to the filtering rule using the applied frame. The filter unit 12 may extract only the header portion from the received frame, generate information in which the descriptions of the D-MAC and the S-MAC included in the header portion are overwritten with the above-mentioned rewritten information and the above-mentioned pre-rewriting information, and perform filtering using the information.

[1-3. Operation]

(1) An example will be described in which the input filter unit 121 as the filter unit 12 performs filtering on the pre-relay frame 8 shown in FIG. 4 in accordance with the filtering rule having the rule number 1 in the first rule table 25A.

In the pre-relay frame 8, the MAC address (that is, MAC-L) of the network switch 10 is described in the D-MAC. However, as described in the D-IP, the pre-relay frame 8 is originally a frame addressed to the second ECU 30B.

Although the input filter unit 121 is located at the preceding stage of the relay processing unit 13, the input filter unit 121 performs filtering based on the description of the applied frame in which the description of the D-MAC is overwritten with the above-mentioned rewritten information in the pre-relay frame 8 by the filter processing described above. The rewritten information described above indicates the MAC address (that is, the MAC-B) of the second ECU 30B. As a result, the pre-relay frame 8 is transferred without being discarded by the input filter unit 121 in accordance with the filtering rule having the rule number 1.

In this example, for comparison, the operation of a network switch will be described in which a filter for performing filtering based on the description of the pre-relay frame 8 (hereinafter referred to as a pre-stage comparison filter unit) is provided in place of the input filter unit 121 in the preceding stage of the relay processing unit 13. When the pre-stage comparison filter unit performs filtering in accordance with the filtering rule having the rule number of 1 in the first rule table 25A, the pre-relay frame 8 is not transferred and is discarded.

This is because the MAC address (that is, MAC-L) of the network switch 10 is described in the D-MAC. In other words, when the filtering is simply performed based on the description of the input frame, unlike the present embodiment, there may be a case where the filtering that should be performed originally is not appropriately realized.

(2) An example will be described in which the output filter unit 122 serving as the filter unit 12 performs filtering on the post-relay frame 9 shown in FIG. 4 in accordance with the filtering rule whose rule number is 1 in the first rule table 25A. In the post-relay frame 9, the MAC address (that is, MAC-L) of the network switch 10 is described in the S-MAC. However, as described in the S-IP, the post-relay frame 9 is originally a frame whose source is the first ECU 30A.

Although the output filter unit 122 is located at the succeeding stage of the relay processing unit 13, as described above, the output filter unit 122 performs filtering based on the description of the frame in which the description of the S-MAC is overwritten with the above-mentioned pre-rewriting information in the post-relay frame 9. The above-mentioned pre-rewriting information indicates the MAC address of the first ECU 30A (that is, the MAC-A). As a result, the post-relay frame 9 is transferred without being discarded by the output filter unit 122.

For comparison, the operation of a network switch in which a filter for performing filtering based on the description of the post-relay frame 9 (hereinafter referred to as a post-comparison filter unit) is provided in place of the output filter unit 122 at the succeeding stage of the relay processing unit 13 will be described. When the subsequent-stage comparison filter unit performs filtering according to the filtering rule having the rule number of 1 in the first rule table 25A, the post-relay frame 9 is discarded.

This is because the MAC address (that is, MAC-L) of the network switch 10 is described in the S-MAC. In other words, when the filtering is simply performed based on the description of the input frame, unlike the present embodiment, there may be a case where the filtering that should be performed originally is not appropriately realized.

[1-4. Effects]

According to the first embodiment described in detail above, the following effects are obtained.

(1a) In the network switch 10, the relay processing unit 13 is configured to rewrite at least one predetermined target field among the multiple fields included in the received frame. The filter unit 12 is configured to execute processing according to the filtering rule based on the description of the frame in which the rewritten description is applied to at least one target field in a received frame.

In the network switch 10, at least one field may be rewritten for the received frame. In order to realize various filtering, it may be desirable to perform filtering on a frame in which the field has been rewritten.

In the present disclosure, the network switch 10 can perform filtering on the frame in which the target field has been rewritten. In other words, when it is desired to perform filtering on the frame in which the field has been rewritten, the filtering can be appropriately performed. As a result, various filtering can be realized for the frame.

(1b) The target field is a source field and a destination field. The input processing unit 11 may be configured to store at least one piece of management information in the storage unit 16. The control information is information for associating the description before rewriting by the relay processing unit 13 in the target field with the rewritten description.

In S120, the filter unit 12 may be configured to identify the description after rewriting by the relay processing unit 13 in the destination field of the received frame based on the management information.

As a result, even when the filter unit 12 is installed at the preceding stage of the relay processing unit 13, the description after rewriting by the relay processing unit 13 can be identified. Then, the filter unit 12 can perform filtering based on the description of the frame after rewriting.

(1c) In S130, the filter unit 12 may be configured to identify the description before rewriting by the relay processing unit 13 in the source field of the received frame based on the management information.

As a result, even when the filter unit 12 is installed at the succeeding stage of the relay processing unit 13, the description before rewriting by the relay processing unit 13 can be identified. Then, the filter unit 12 can perform filtering based on the description of the frame before rewriting.

(1d) Further, the filter unit 12 may be configured to execute the processing based on the description of the applied frame in S140. The applied frame is a frame in which the above-mentioned description after rewriting is applied to the destination field in the received frame, and the above-mentioned description before rewriting is applied to the source field in the received frame. The above-mentioned description after rewriting by the relay processing unit 13 is a description identified in S120. The above-mentioned description before rewriting by the relay processing unit 13 is a description identified in S130.

As a result, the filter unit 12 can appropriately realize filtering regardless of whether the filter unit 12 is positioned at the preceding stage or the succeeding stage of the relay processing unit 13.

(1e) In the network switch 10 that performs IP routing, in the received frame, the source field described above is a field in which S-MAC is described, and the source field described above is a field in which D-MAC is described. As a result, even when S-MAC and D-MAC are rewritten in the network switch 10 that performs IP-routing, the network switch 10 can appropriately perform filtering.

[1-5. Modifications]

[Modification 1-1] The rule table 25 applied to the input filter unit 121 and the rule table 25 applied to the output filter unit 122 may be different from each other.

[Modification 1-2] The filter units 12 may include only one of the input filter unit 121 and the output filter unit 122.

Figure 9:
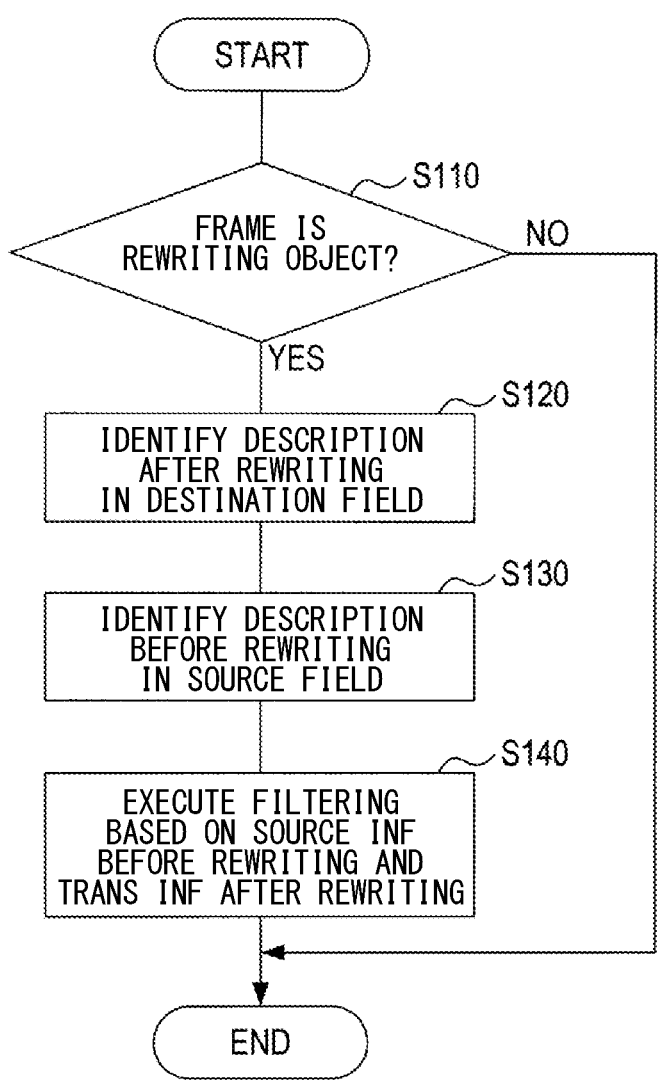
FIG. 9 is a flowchart of a filter processing according to a first embodiment.

[Modification 1-3] When the filter unit 12 includes only the input filter unit 121, the filter unit 12 may be configured to execute a filter processing in which S130 is omitted in FIG. 9.

[Modification 1-4] When the filter unit 12 includes only the output filter unit 122, the filter unit 12 may be configured to execute a filter processing in which S120 is omitted in FIG. 9.

2. Second Embodiment

[2-1. Configuration]

Since a basic configuration of a second embodiment is the same as that of the first embodiment, differences will be described below. The same reference numerals as in the first embodiment denote the same components, and reference is made to the preceding description.

Figure 10:
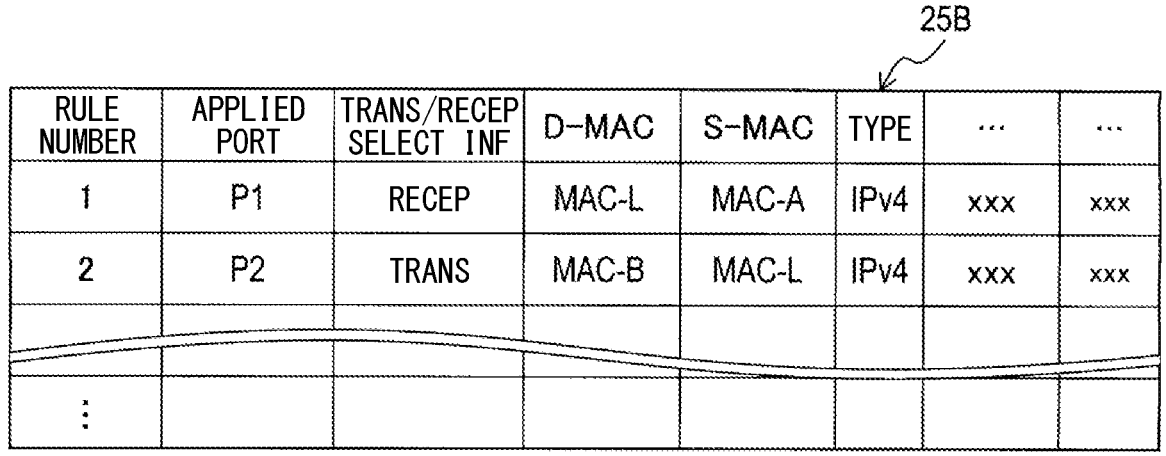
FIG. 10 is an illustrative diagram illustrating an example of a second rule table.

In the first embodiment described above, the filter unit 12 performs filtering according to the filtering rule. On the other hand, the second embodiment differs from the first embodiment in that transmission-reception selection information is added as a condition item to the above-described filtering rule as in the second rule table 25B shown in FIG. 10. The transmission-reception selection information is information indicating which of the reception port and the transmission port the filtering rule is applied to.

In this example, when the transmission-reception selection information indicates the reception port, the filter unit 12 is configured to perform filtering on a frame before rewriting by the relay processing unit 13. On the other hand, when the transmission-reception selection information indicates the transmission port, the filter unit 12 is configured to perform filtering on the frame after rewriting by the relay processing unit 13.

[2-2. Processing]

Figure 11:
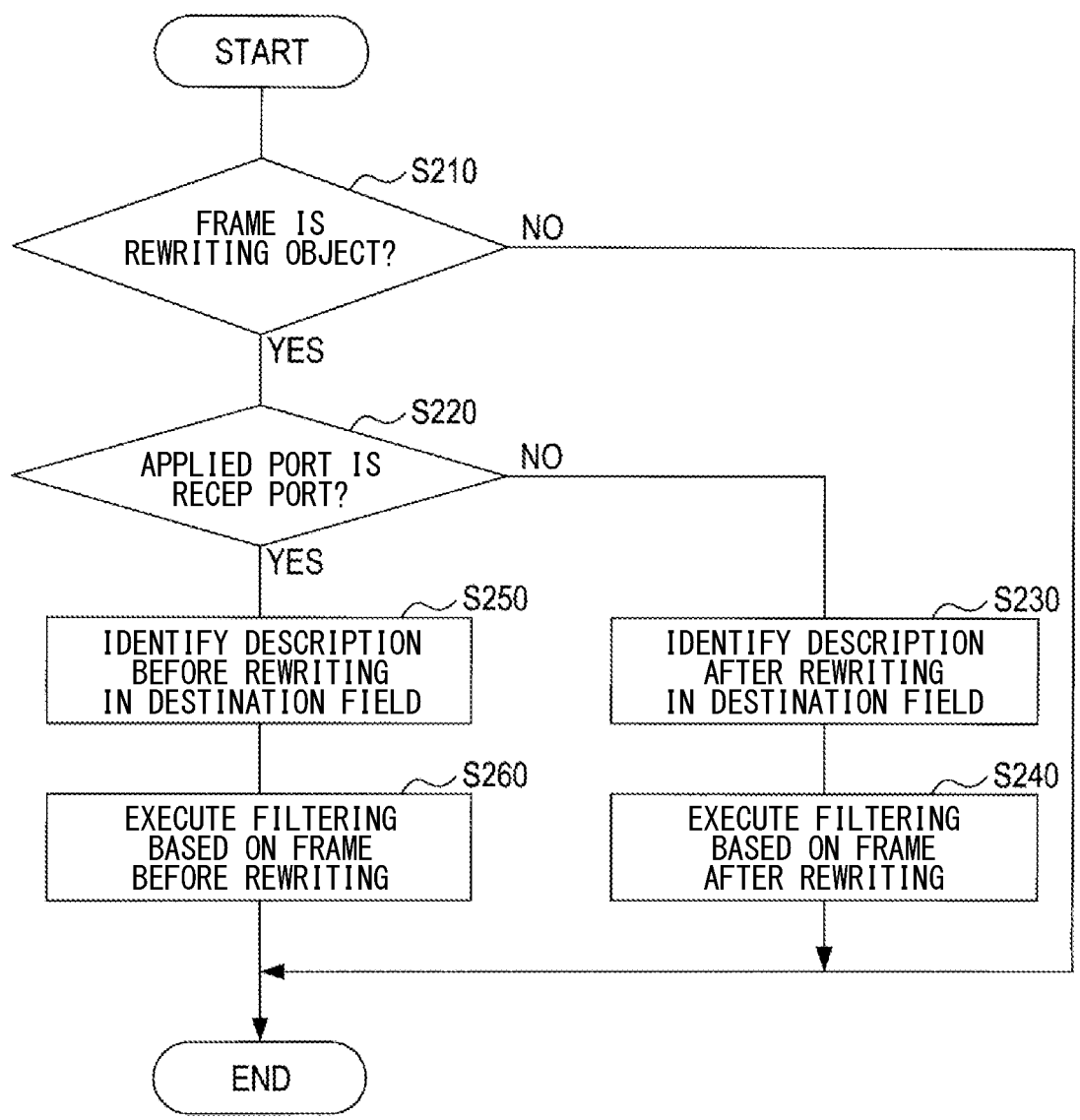
FIG. 11 is a flowchart of a filter processing according to a second embodiment.

Next, a filter unit executed by the filter unit 12 of the second embodiment in place of the filter processing of the first embodiment shown in FIG. 9 will be described with reference to a flowchart of FIG. 11. Since the processing of S210 in FIG. 11 is the same as the processing of S110 in FIG. 9, a description of the processing in S210 will be omitted. In the following description of the filter processing, the received frame refers to a frame input to the filter unit 12.

In S220 to which the process proceeds when it is determined that the frame received in S210 is to be rewritten, the filter unit 12 determines which of the reception port and the transmission port the filtering rule is applied to, based on the transmission-reception selection information of the second rule table 25B.

In this example, when the transmission-reception selection information indicates the transmission port, the filter unit 12 determines that the filtering rule is applied to the transmission port, and shifts the process to S230. On the other hand, when the transmission-reception selection information indicates the reception port, the filter unit 12 determines that the filtering rule is applied to the reception port, and shifts the process to S250.

In S230, similarly to S120 described above, the filter unit 12 identifies the description after rewriting by the relay processing unit 13 in the destination field of the received frame based on the management information. The destination field is a field in which a destination MAC address is described. Then, the filter unit 12 identifies the description of the frame after rewriting by the relay processing unit 13 with the use of the identified description after rewriting. The filter unit 12 may store the description of the frame after rewriting by the relay processing unit 13 in the storage unit 16.

In the following S240, the filter unit 12 executes processing according to the filtering rule based on the description of the frame after rewriting by the relay processing unit 13, which is identified in S230. In this example, the description of the frame after rewriting by the relay processing unit 13, which is identified in S230 corresponds to a description of the applied frame. Then, the filter unit 12 terminates the present filter processing.

In S250, similarly to S130 described above, the filter unit 12 identifies the description of the frame before rewriting by the relay processing unit 13 in the source field of the received frame based on the management information. The source field referred to in the present specification is a field in which the source MAC address is described. Then, the filter unit 12 identifies the description of the frame before rewriting by the relay processing unit 13 with the use of the identified description before rewriting. The filter unit 12 may store the description of the frame before rewriting by the relay processing unit 13 in the storage unit 16.

In the following S260, the filter unit 12 executes processing according to the filtering rule based on the description of the frame before rewriting by the relay processing unit 13. In this example, the description of the frame before rewriting by the relay processing unit 13, which is identified in S250 corresponds to a description of the applied frame. Then, the filter unit 12 terminates the present filter processing.

[2-3. Operation]

(1) An example in which the input filter unit 121 performs filtering according to the second rule table 25B will be described. It is assumed that the pre-relay frame 8 shown in FIG. 4 is input to the input filter unit 121.

In this example, the input filter unit 121 performs filtering based on the description of the pre-relay frame 8 in S250 and S260 according to the filtering rule having the rule number of 1. As a result, the pre-relay frame 8 is transferred without being discarded, and filtering is appropriately performed. On the other hand, according to the filtering rule having the rule number of 2, the input filter unit 121 executes processing according to the filtering rule based on the description of the frame after rewriting by the relay processing unit 13 in S230 and S240. As a result, the pre-relay frame 8 is transferred without being discarded, and filtering is appropriately performed.

(2) An example in which the output filter unit 122 performs filtering according to the second rule table 25B will be described. It is assumed that the post-relay frame 9 shown in FIG. 4 is input to the output filter unit 122.

In this example, the output filter unit 122 performs filtering based on the description of the post-relay frame 9 in S250 and S260 according to the filtering rule having the rule number of 1. As a result, the post-relay frame 9 is transferred without being discarded, and filtering is appropriately performed. On the other hand, according to the filtering rule having the rule number of 2, the output filter unit 122 executes processing according to the filtering rule based on the description of the frame before rewriting by the relay processing unit 13 in S230 and S240. As a result, the post-relay frame 9 is transferred without being discarded, and filtering is appropriately performed.

[2-4. Effects]

According to the second embodiment described in detail above, the effect (1a) of the first embodiment is obtained, and the following effect is obtained.

(2a) The filtering rule may describe transmission-reception selection information indicating that the filtering rule is applied to one of the reception port and the transmission port. In S220, the filter units 12 may be configured to determine whether the filtering rule is applied to the reception port or the transmission port based on the transmission-reception selection information.

In S240, the filter unit 12 may be configured to execute processing based on the description of the frame after rewriting by the relay processing unit 13 when it is determined that the filtering rule is applied to the transmission port.

As a result, when the filter unit 12 includes the output filter unit 122, filtering can be appropriately performed based on the description after rewriting by the relay processing unit 13.

(2b) In S260, when it is determined that the filtering rule is applied to the reception port, the filter unit 12 may be configured to execute processing based on the description of the frame before rewriting by the relay processing unit 13.

As a result, when the filter unit 12 includes the input filter unit 121, filtering can be appropriately performed based on the description before rewriting by the relay processing unit 13.

[2-5. Modifications]

[Modification 2-1] The rule table 25 applied to the input filter unit 121 and the rule table 25 applied to the output filter unit 122 may be different from each other.

[Modification 2-2] The filter unit 12 may include only one of the input filter unit 121 and the output filter unit 122.

[Modification 2-3] When the filter unit 12 includes only the input filter unit 121, the filter unit 12 may be configured to execute a filter processing in which S250 is omitted in FIG. 11. The input filter unit 121 may be configured to perform filtering on the reception port or may be configured to perform filtering on the transmission port.

[Modification 2-4] When the filter unit 12 includes only the output filter unit 122, the filter units 12 may be configured to execute a filter processing in which S230 is omitted in FIG. 11. The output filter unit 122 may be configured to perform filtering on the reception port or may be configured to perform filtering on the transmission port.

[Modification 2-5] The filter unit 12 may be configured such that only the filtering rule in which transmission-reception selection information indicates the reception port is applied to the input filter unit 121. In addition, the filter unit 12 may be configured such that only the filtering rule indicating that the transmission-reception selection information indicates the transmission port is applied to the output filter unit 122. In this instance, the filter units 12 may be configured to execute the filter processing in which S230 and S250 are omitted in FIG. 11.

In the above embodiment, the network switch 10 corresponds to a relay device, the input processing unit 11 corresponds to an information storage unit, the filter units 12 corresponds to an execution unit, the relay processing unit 13 corresponds to a rewriting unit, and the storage unit 16 corresponds to a storage device. S140, S240, and S260 corresponds to processing as an execution unit, S120 and S230 corresponds to processing as an identification unit, and S220 corresponds to processing as a determination unit. Also, the pre-relay frame 8 and the post-relay frame 9 correspond to frames received.

3. Other Embodiments

Although the embodiments of the present disclosure have been described above, the present disclosure is not limited to the embodiments described above, and various modifications can be made to implement the present disclosure.

(3a) In the embodiment described above, the network switch 10 is a L2/L3 switch applied to IP-routing, but the present disclosure is not limited to such a switch.

For example, the network switch 10 may be a router to which NAT, NAPT, or the like is applied. NAT is an abbreviation for Network Address Translation. NAPT is an abbreviation for Network Address Port Translation. In other words, the relay processing unit 13 may be configured to execute processing of an upper layer such as L3/L4.

In the received frame, the field in which the S-IP is described corresponds to a source field, and the field in which the D-IP is described corresponds to a destination field. In the present embodiment, the NAT table and the NAPT table correspond to the above-described management information.

(3b) In the above-described embodiment, the input processing unit 11 is configured to acquire or generate all of multiple pieces of management information such as the port table 21, the ARP table 22, the routing table 23, the MAC address information 24, and the like, and store the management information in the storage unit 16, but the present disclosure is not limited to the above configuration.

For example, the input processing unit 11 may be configured to acquire or generate one of the multiple pieces of management information described above, and store the management information in the storage unit 16. In this case, for example, the remaining management information may be acquired or generated by a configuration other than the input processing unit 11 such as the filter unit 12. In this case, for example, the remaining management information may be stored in advance in the storage unit 16.

In addition, the input processing unit 11 may be configured to add at least one of all pieces of management information to a frame received by the ports P1, P2, and P3, and transmit the frame to the filter unit 12. In this case, the remaining management information of all the management information may be acquired or generated by a configuration other than the input processing unit 11, such as the filter unit 12, or may be stored in the storage unit 16 in advance.

(3c) The target field may be a pair of one source field and one destination field.

(3d) The multiple functions of one component in the above embodiment may be realized by multiple components, or a function of one component may be realized by multiple components. In addition, multiple functions of multiple components may be realized by one component, or a single function realized by multiple components may be realized by one component. In addition, a part of the configuration of the above embodiment may be omitted. At least a part of the configuration of the above embodiment may be added to or substituted for the configuration of the other above embodiment.

(3e) In addition to the above-described network switch 10, the present disclosure may be implemented in various forms, such as the filter unit 12 and the communication system 1 including the network switch 10 as a component.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device configured to relay a frame between a plurality of communication lines, the relay device comprising:
    a rewriting circuit configured to rewrite at least one predetermined target field among a plurality of fields included in a received frame; and
    an execution circuit configured to execute a process on the received frame according to a predetermined filtering rule,
    wherein:
    the execution circuit executes the process based on a description of an applied frame which is prepared by applying a description after rewriting the target field in the received frame by the rewriting circuit,
    the target field includes a source field in which a transmission source is described and a destination field in which a transmission destination is described,
    the relay device further comprising:
    an information storage circuit configured to store at least one piece of management information in a storage device; and
    an identification circuit that identifies at least the description after rewriting the destination field in the received frame by the rewriting circuit, based on the management information, wherein:
    the at least one piece of management information associates a description of the target field before rewriting by the rewriting circuit with a description of the target field after rewriting by the rewriting circuit.

2. The relay device according to claim 1, wherein:
    the execution circuit is configured to execute the process based on the description of the applied frame, which is prepared by applying the description after rewriting identified by the identification circuit to the destination field in the received frame and by applying the description before rewriting by the rewriting circuit to the source field in the received frame.

3. The relay device according to claim 1, further comprising:
    a plurality of ports, wherein:
    each of the plurality of ports is configured to function as a reception port and a transmission port; and
    the filtering rule includes transmission-reception selection information indicating that the filtering rule is applied to one of the reception port and the transmission port;
    the relay device further comprising:
    a determination circuit configured to determine whether the filtering rule is applied to the transmission port, based on the transmission-reception selection information; and
    the execution circuit is configured to execute the process based on the description of the frame after rewriting by the rewriting circuit when it is determined that the filtering rule is applied to the transmission port.

4. The relay device according to claim 1, further comprising:
    a plurality of ports, wherein:
    each of the plurality of ports is configured to function as a reception port and a transmission port; and
    the filtering rule includes transmission-reception selection information indicating that the filtering rule is applied to one of the reception port and the transmission port;
    the relay device further comprising:
    a determination circuit configured to determine whether the filtering rule is applied to the reception port, based on the transmission-reception selection information; and
    the execution circuit is configured to execute the process based on the description of the frame before rewriting by the rewriting circuit when it is determined that the filtering rule is applied to the reception port.

5. The relay device according to claim 1, wherein:
    in the received frame, the source field is a field in which a source MAC address is described, and the destination field is a field in which a destination MAC address is described.

6. The relay device according to claim 1, wherein:
    in the received frame, the source field is a field in which a source IP address is described, and the destination field is a field in which a destination IP address is described.

7. A relay device configured to relay a frame between a plurality of communication lines, the relay device comprising:
    a rewriting circuit configured to rewrite at least one predetermined target field among a plurality of fields included in a received frame;
    an execution circuit configured to execute a process on the received frame according to a predetermined filtering rule; and a plurality of ports,
wherein:
the execution circuit executes the process based on a description of an applied frame which is prepared by applying a description after rewriting the target field in the received frame by the rewriting circuit,
each of the plurality of ports is configured to function as a reception port and a transmission port; and
the filtering rule includes transmission-reception selection information indicating that the filtering rule is applied to one of the reception port and the transmission port;
the relay device further comprising:
a determination circuit configured to determine whether the filtering rule is applied to the reception port, based on the transmission-reception selection information; and
the execution circuit is configured to execute the process based on the description of the frame before rewriting by the rewriting circuit when it is determined that the filtering rule is applied to the reception port.

8. The relay device according to claim 7, wherein:
in the received frame, the source field is a field in which a source MAC address is described, and the destination field is a field in which a destination MAC address is described.

9. The relay device according to claim 7, wherein:
in the received frame, the source field is a field in which a source IP address is described, and the destination field is a field in which a destination IP address is described.

* * * * *